United States Patent

Hamann

[15] 3,662,204

[45] May 9, 1972

[54] LINE SCANNING CATHODE RAY TUBE HAVING SLOTTED STORAGE ELEMENT

[72] Inventor: Omer F. Hamann, La Jolla, Calif.

[73] Assignee: Stromberg Datagraphic, Inc., San Diego, Calif.

[22] Filed: Apr. 3, 1970

[21] Appl. No.: 25,335

[52] U.S. Cl. ........................................ 313/68 D, 313/92 LF

[51] Int. Cl. .................. H01j 31/18, H01j 31/58, H01j 29/24

[58] Field of Search ................................ 346/110 X; 313/68

[56] References Cited

UNITED STATES PATENTS

| | | | |
|---|---|---|---|
| 2,755,409 | 7/1956 | Dufour | 313/68 X |
| 3,188,650 | 6/1965 | Schroter | 346/110 X |
| 3,368,106 | 2/1968 | Berthold | 346/110 X |

*Primary Examiner*—Robert Segal
*Attorney*—John R. Duncan

[57] ABSTRACT

A line scanning cathode ray tube is disclosed, wherein light output is increased by provision of a flood gun and a line image storage element between the flood gun and the electron target. Resolution is maintained by disposing the storage surface along the edge of a narrow slit in an electron opaque plate. In the preferred embodiment, a fiber optics faceplate is provided to more efficiently utilize the light output.

2 Claims, 5 Drawing Figures

INVENTOR.
OMER F. HAMANN
BY
John R. Duncan
ATTORNEY

INVENTOR.
OMER F. HAMANN

BY John R Duncan

ATTORNEY

LINE SCANNING CATHODE RAY TUBE HAVING SLOTTED STORAGE ELEMENT

BACKGROUND OF THE INVENTION

This invention relates to cathode ray tubes and, more particularly, to line scanning cathode ray tubes.

Some applications of cathode ray tubes require only the generation of a line image on the target of the tube, while others require the generation of area images. Line images are satisfactory and even desirable in facsimile scanning and facsimile printing, and in the recording of the signals from side-looking mobile radars. In such applications, the cathode ray tube beam typically scans only along a line, while the original copy to be scanned, the paper to be printed, or the film to be recorded is moved past the cathode ray tube in a direction generally perpendicular to the scanned line. The combination of cathode ray tube scanning along one axis and copy, paper or film motion along the other axis eventually covers every point of the area image to be scanned or recorded. Cathode ray tubes are preferred over other light sources for scanning and recording images because cathode ray tubes can be modulated at video rates.

Some applications of cathode ray tubes require a high level of light output from the displayed image. For example, in the recording of images on light sensitive materials, materials are available which allow image development without the use of chemicals. Such materials, however, typically require a high intensity light source for exposure in order that exposures may be made at video rates. Certain physical limitations, however, make it impractical to achieve satisfactory levels of intensity in line scanning cathode ray tubes of heretofore known construction. An increase in the beam current density of the cathode ray tube will increase the light output level. However, such a current increase results in increased beam spreading because of the increase in the mutual repulsive forces between the beam electrons, and a current level is eventually reached at which satisfactory beam width and resolution cannot be maintained. An increase in accelerating potential will likewise increase the light output, as it increases the power input to the phosphor screen of the cathode ray tube. Practical phosphor screens are limited, however, as to the peak power which can be absorbed without loss of efficiency or permanent damage to the phosphor.

SUMMARY OF THE INVENTION

Very generally, the line scanning cathode ray tube of the invention comprises an evacuated envelope and a first electron beam source providing a first electron beam. An electron responsive target is positioned for receiving electrons from the first electron beam, and a storage element is positioned between the source and the target. A second electron beam source is also provided, and the beam it produces is directed and modulated to produce a line image of stored electrical charges on the storage element. The storage element acts as an electron valve controlling portions of the first beam in accordance with the charges stored along corresponding portions of the line image, to reproduce the stored line image on the target. Since the first beam is sufficient in cross section to flood the entire stored line image, all of the portions of the stored line image may be reproduced on the target simultaneously. The storage element preferably includes an electron opaque plate with a narrow slot therein to limit the width of the displayed line image, and a secondary emitting layer adjacent the slot for storing electrical charges.

It is an object of the present invention to provide an improved line scanning cathode ray tube.

Another object of the invention is to provide a line scanning cathode ray tube capable of providing a displayed image of high light output capable of being modulated at video rates.

A further object of the invention is to provide an improved line scanning cathode ray tube for recording on the types of light sensitive materials which may be developed without chemicals.

Another object of the invention is to provide an improved line scanning cathode ray tube in which light output is increased while maintaining high resolution.

A further object of the invention is to provide a cathode ray tube capable of high light output without the use of high current density electron beams or high accelerating voltages.

It is also an object of the invention to provide an improved storage element for a line scanning cathode ray tube.

Another object of the invention is to provide a storage element for a line scanning cathode ray tube which limits the width of the scanned line.

Other objects of the invention will become apparent to those skilled in the art from the following description, taken in connection with the accompanying drawings.

DESCRIPTION OF THE PREFERRED EMBODIMENT

Figure 1:
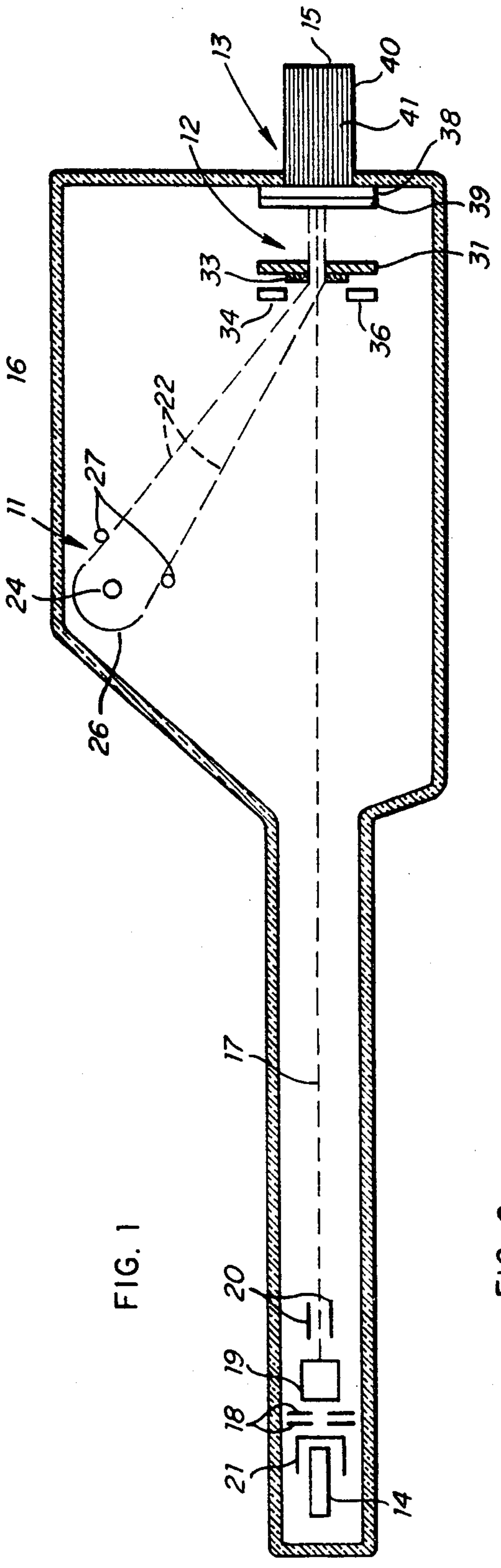
FIG. 1 is a schematic view of a cathode ray tube constructed in accordance with the invention.

Referring now to FIG. 1, the various elements of the cathode ray tube of the invention are enclosed within an evacuated envelope 16. The envelope 16 may be of any suitable material, such as glass, ceramic or metal, and is shaped in a manner to accommodate the internal elements subsequently described. The target 13 is located at one end of the tube and is at least partially enclosed within the envelope. The target has an exit surface 15 at one end from which an image is projected for exposing light sensitive material, as will be explained.

The tube illustrated in FIG. 1 is for producing an image of a single scan line of information for purposes of recording such information on light sensitive material brought adjacent the display surface 15 of the target 13. An electron beam 17, referred to as the write beam, is produced by the electron gun 14 and is accelerated by suitable accelerating elements 18 toward the storage element 12. The beam is passed between a pair of opposed deflection plates 19. The plates 19 are disposed to produce a horizontal electrostatic field for causing deflection of the beam in a horizontal manner. The beam is also passed between a pair of opposed deflection plates 20, disposed to produce a vertical electrostatic field for causing deflection of the beam in a vertical manner. A repetitive sweep voltage may be applied to the horizontal deflection plates 19 to cause the beam 20 to scan a horizontal line on the storage element. A manually controlled centering voltage may be applied to the vertical plates 20 to center the scanned line vertically on the storage element. By a suitable grid electrode 21, the intensity of the write beam 17 may be modulated. Thus, the plates 19 and 20 and the grid 21 may be operated to direct and modulate the write beam 17 to produce an electrical charge image along a line on the storage element 12.

Electromagnetic deflection means may be substituted for the electrostatic plates 19, 20 in the invention. Electrostatic means are preferred in applications requiring small-angle high-speed deflection, while electromagnetic means are preferred in applications requiring large-angle moderate-speed deflection.

Figure 2:
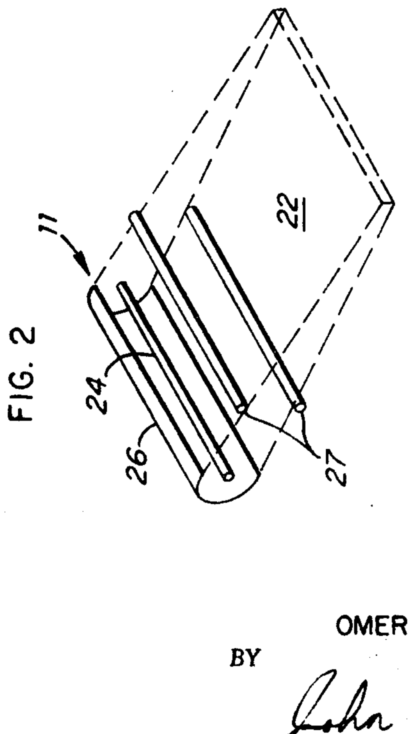
FIG. 2 is a perspective schematic view of a portion of the cathode ray tube of FIG. 1.

For reasons which will be explained in detail below, the electron beam source 11 directs a beam of elongated rectangular cross section, referred to as the flood beam, at the storage element 12. The envelope of the beam of electrons produced by the source 11 is indicated at 22. The construction of the source 11 may be more clearly seen in FIG. 2, and consists of a line cathode or filament 24 partially surrounded by a generally cylindrical repeller electrode 26. When the filament 24 is heated, electrons are emitted and are repelled by the repeller electrode 26 to pass between a pair of accelerator electrodes 27. With electrodes 27 maintained at a high positive potential relative to the potential of the filament, the electrons will be accelerated into the flood beam 22 as shown.

Figure 3:
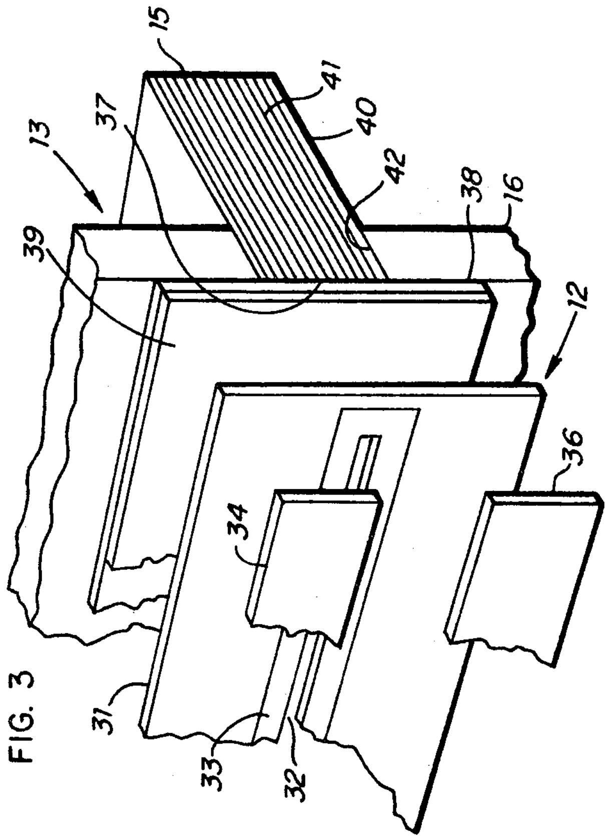
FIG. 3 is an enlarged perspective view of a storage element and an electron responsive target which may be used in the cathode ray tube of FIG. 1.

Referring now to FIG. 3, an enlarged perspective view illustrates the storage element 12, along with the electron target of the cathode ray tube. The storage element includes a metal plate 31 having an elongated slot 32 therein. The slot 32 corresponds in length and width to the length and width of the line to be displayed. A layer 33 of dielectric material having a high secondary emission ratio, such as magnesium fluoride, is deposited upon the plate 31 in the area immediately surrounding the periphery of the slot 32. A collector, consisting of two metal electrodes 34 and 36, is positioned adjacent the slot 32 on the same side of the plate 31 as the secondary emitter 33. The collector collects secondary electrons from the plate 31 and the layer 33, as well as the portions of the primary electrons from the flood beam 22 which, because of the charge pattern on the storage element 12, do not pass through the slot 32 in the plate 31. The electrodes 34 and 36 are positioned adjacent the slot 32 and are generally parallel thereto.

The slot 32 is preferably made by photoetching a narrow aperture through the central portion of a single metal plate 31. The slot is then bounded on four sides, as shown in FIG. 3. Equivalent results may be obtained, however, if the apertured plate 31 is replaced by two separate rectangular plates mounted in the same plane with adjacent edges parallel, so that the adjacent edges define the two long sides of the slot 32. It is not necessary that the other two sides be bounded.

On the opposite side of the plate 31 from the electrodes 34 and 36 is the target 13 upon which the image segments stored on the storage element 12 by the write beam 17 are reproduced simultaneously by the portions of flood beam 22 which pass through the slot 32. The target 13 includes a layer 38 of phosphor and a layer 39 of aluminum which overlies the phosphor layer 38. The phosphor layer 38 is supported on the surface 37 of a faceplate 40. The faceplate 40 comprises a fused bundle of optical fibers 41. The faceplate 40 extends through a suitable opening 42 in the envelope 16, and is sealed to the envelope 16 in order to serve as a part of the envelope. The inner ends of the optical fibers 41 terminate at phosphor layer 38, and the outer ends terminate at the exit surface 15.

Figure 4:
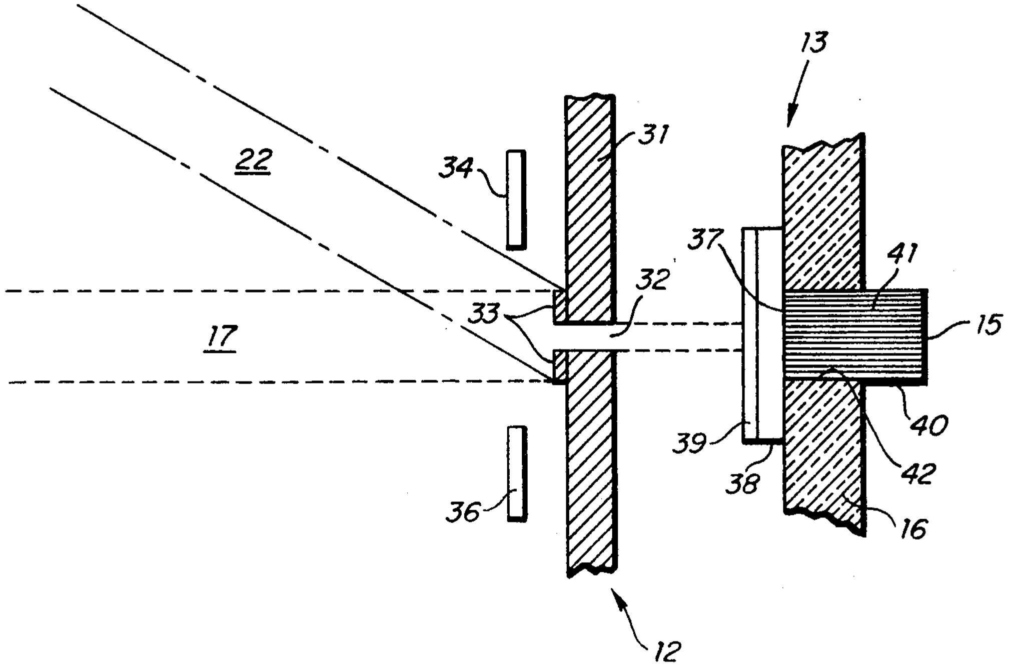
FIG. 4 is an enlarged schematic view illustrating a portion of the cathode ray tube of FIG. 1 with the storage element and target of FIG. 3 incorporated therein.

Referring now to FIG. 4, the details of the operation of the cathode ray tube of the invention may be better understood. The write beam 17 is directed against a selected portion of the elongated storage element 12 to impinge upon the layer 33 of secondary emissive material. At the same time, the flood beam 22 also impinges upon the layer 33 along the entire length of the slot 32. As the write beam 17 is swept along the length of the slot, it is modulated in intensity so that some portions of the layer 33 are struck by write beam 17 and others are not, thus producing a desired line image, as further explained hereafter.

The image produced on the storage element is referred to as a line image because the segments of the image are distributed in one dimension only. The line image has a finite width, although the width is typically much less than the length.

The layer 33 is made of a dielectric material which has the property of emitting secondary electrons upon the impingement of primary electrons. The ratio of the number of secondary electrons emitted to the number of primary electrons impinged depends on the velocity of the impinging electrons, and is referred to as the secondary emission ratio. The accelerating voltage of the flood gun 11, with respect to the plate 31, is adjusted to give the primary electrons of flood beam 22 a velocity which produces a secondary emission ratio less than unity, upon striking the layer 33. Accordingly, the surface of dielectric layer 33 is charged negatively with respect to the plate 31. The accelerating voltage of the write gun 14, with respect to plate 31, is adjusted to give the primary electrons of write beam 17 a velocity which produces a secondary emission ratio greater than unity, upon striking the layer 33. Accordingly, the portions of the layer 33 struck by write beam 17 are charged positively with respect to the plate 31. The portions struck by electrons from write beam 17 are also struck by electrons from flood beam 22, but the write beam prevails over the flood beam because of the greater current density of the write beam. A line image consisting of positively and negatively charged portions is thus formed along the length of the layer 33, in response to the modulation impressed on the beam 17 as it is swept along the length of slot 32.

Further descriptions of the construction and operation of secondary emitting storage elements are disclosed in the copending application of Eli C. Gear, Ser. No. 644,837, filed June 9, 1967, and assigned to the assignee of the instant application.

The electrons of flood beam 22 which travel toward the slot 32 are controlled by the positive and negative charges stored along the length of layer 33. Those electrons traveling toward portions of the slot 32 bordered by negative charges are repelled toward collector electrodes 34, 36. Those electrons traveling toward segments of the slot bordered by positive charges are accelerated through the slot, where they are further accelerated by a strong electric field between plate 31 and the target 13. This field is established by impressing a positive potential on the aluminum layer 39, with respect to the plate 31.

Since the layer 33 is a dielectric, positive charges produced on portions of it by the write beam 17 remain for some time after the write beam has passed. The persistence of the charge image stored on layer 33 may be controlled by adjusting the potential of the metal plate 31. By proper adjustment of this potential, the surface of layer 33 may be recharged negatively by the beam 22 at a rate determined by the current density of beam 22 and the storage surface substrate potential. The persistence is preferably adjusted to retain the stored image produced by one sweep of the beam 17 until the next sweep occurs. Operation in this manner can produce continuous excitation of the phosphor 38, thereby achieving much greater light output than is achieved by intermittent excitation in a conventional cathode ray tube. However, the persistence must not be so long that the motion of the film or paper past the exit surface 15 causes smearing of the resulting image. The persistence may be adjusted to retain stored images for less than one sweep period, if necessary, although the gain in light output is then correspondingly reduced.

The advantage of increased light output in the instant invention is a result of the persistence of storage on the surface 33, as may be explained by considering the physical limitations on the light output of cathode ray tubes. The light output which can be achieved in a conventional line scanning cathode ray tube, in which the scanning electron beam strikes each elemental area of the phosphor only a fraction of the time, is limited by the physical properties of the phosphor and of the beam. The average intensity of the light emitted from a point on the line may be represented by the following equation:

$$L = k\frac{I}{A}nEF$$

Where:

$L$ is the average intensity of light at a point on the line.
$I$ is the beam current.
$A$ is the cross sectional area of the beam.
$n$ is the phosphor efficiency.
$E$ is the accelerating voltage of the beam.
$F$ is the fraction of the time during which the beam strikes any particular point.
$k$ is a constant of proportionality.

The factor $I/A$ is the current density of the electron beam impinging on the phosphor. Unfortunately, an increase in beam current $I$ causes the beam to spread, and A increases also, so that current density does not increase linearly with current. Furthermore, in conventional tubes, the spreading of the beam reduces resolution. In the tube of the instant invention, an increase in current density in the flood beam 22 causes little or no spreading in the vertical direction because of the limited width of the slot 32. The efficiency of the phosphor, $n$, is not constant, but depends upon the accelerating voltage $E$ and the current density $I/A$. An increase in $E$ above the optimum voltage reduces $n$. At higher accelerating potentials, many of the beam electrons have sufficient velocity to penetrate through the phosphor layer and dissipate their kinetic energies in the optical fibers 41. The efficiency, $n$, also is reduced by either excessive current densities or excessive accelerating voltages which increase beam power densities and hence increase the local temperatures of the phosphor crystals. An increase of current density, $I/A$, or voltage, $E$, or both beyond a critical peak beam power density results in vaporization of the phosphor crystals at each point of beam impingement, which permanently destroys the phosphor layer 38 at such points. The duty factor, $F$, in the equation above relates the peak beam power, $IE$, to average beam power, $IEF$. In conventional line scan tubes, the duty factor, $F$, is very small, typically about 0.001, since the beam excites each point on the phosphor only briefly as the beam scans the length of the line. In the instant invention, each point of the line on the phosphor can be excited continuously, and the duty factor can be as high as 1.00.

From the considerations above, it appears that it is impractical to increase light output above a certain limit by merely increasing beam current or accelerating voltage. By increasing the duty factor, however, light output may be increased by as much as three orders of magnitude. The cathode ray tube of the invention realizes such an increase in light output, by the provision of the storage element 12 and the flood gun 11.

The invention may be further explained by means of an example. A typical line scan tube of conventional construction may utilize an electron beam with an effective width of 0.004 inch, and generate a line image 4 inches long. Such a tube is capable of resolving 1,000 picture segments, each 0.004 inch wide, along the length of the scanned line. The electron beam is shared by one thousand segments, so it can excite each segment one thousandth of the time, at most. In a tube of conventional construction, the duty factor therefore cannot exceed about 0.001, and may be less if any significant time is consumed in "flyback" or return of the beam to the sweep starting point. The tube of the invention may be regarded as providing 1,000 separate beams, each with a width of 0.004 inch, in the region between plate 31 and target 13. Hence each 0.004 inch wide picture segment is excited by its own beam all of the time. All of the 1,000 segments may be excited simultaneously, and the excitation of each segment persists for so long a time as a positive electrical charge is retained on the corresponding segment of the dielectric layer 33.

The bundle of optical fibers 41 transmits the light energy from the line image reproduced on the phosphor to the exit surface 15. The high optical efficiency of the optical fibers, coupled with the increased light output provided by the operation of storage element 12, produces an image at exit surface 15 of substantially greater power than obtainable in prior art designs. Optical bundles may be designed to be as much as 50 times more efficient in the translation of optical images than conventional optical systems using objective lenses. An optical bundle having a numerical aperture of 0.85, for example, can provide an image illumination in excess of 50 per cent of the source emittance. A faceplate of optical fibers is preferred, therefore, but a conventional faceplate may be substituted if an objective lens is added to the scanning or recording system.

Further descriptions of optical fiber bundles may be found in the book "Fiber Optics," by N. S. Kapany, published in 1967 by the Academic Press, Library of Congress Card Number 66–26262.

Because of the high power level of the output at the exit surface 15, the invention is particularly useful in the photographic recording of images on the types of light sensitive materials which permit image development without the use of chemicals. Examples of such materials are heat-developable diazosensitized vesicular film (The Kalvar Corporation), heat-developable silver-sensitized films (3M Company), and exposure-developable photochromic films (American Cyanamide Co.). These films have lower sensitivity than conventional liquid-developable silver-halide films, and require a high power light source for exposure at video rates. The invention provides a highly satisfactory means of accomplishing this.

Figure 5:
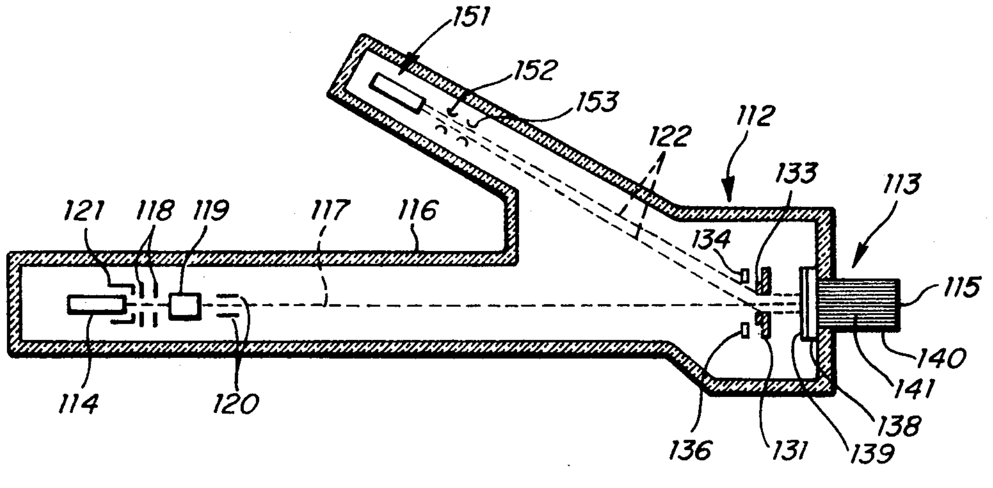
FIG. 5 is a schematic view of an alternative embodiment of the invention.

Referring now to FIG. 5, an alternative embodiment of the invention is illustrated. Elements having functions and designs similar to those elements described in connection with FIG. 1 have been given identical reference numerals, preceded by 1. The difference in the embodiment of FIG. 5 from that of the embodiment previously described lies in the construction of the flood gun. The flood gun consists of an electron gun 151 serving as a point source, rather than a line source, of electrons. The cross section of the point source beam thus produced is shaped by successive pairs 152 and 153 of cylindrical electron lenses into an elongated rectangular shape, equivalent to the beam produced by a line source. The embodiment of FIG. 5 has the advantage that the electron gun 151 may be made of standard components used in the manufacture of television tubes, hence the components are readily available at low cost. The flood gun of the FIG. 5 embodiment has the disadvantage, however, that it may produce a less uniform rectangular beam than the flood gun of the preferred embodiment. Except for the differences in the flood guns, the construction and operation of the embodiment of FIG. 5 is identical with that of the previously described embodiment.

It may therefore be seen that the invention provides an improved cathode ray tube and a storage element for use therein. A very high level of image intensity is attainable while maintaining high resolution compared with heretofore known line scanning cathode ray tubes. Because of its ability to produce a high level of intensity, the cathode ray tube of the invention has particular application in the photographic recording of successive lines of information on light sensitive material of relatively low sensitivity.

Various modifications of the invention in addition to those shown and described herein will become apparent to those skilled in the art from the foregoing description and accompanying drawings. Such modifications are intended to fall within the scope of the invention, as defined in the appendant claims.

I claim:

1. A line scanning cathode ray tube comprising:

an evacuated envelope;

an electron responsive target at least partially within said envelope, said target including a bundle of optical fibers having an input surface at one end of the fibers and an exit surface at the other end, said bundle being disposed as part of said envelope with the input surface within the envelope and the exit surface without, and a layer of cathodoluminescent material disposed on the input surface, whereby the bundle of optical fibers transfers the reproduced image from the cathodoluminescent layer to the exit surface;

a slotted storage element within said envelope positioned closely adjacent to said target, said storage element consisting of a substantially planar electron opaque plate having a single elongated slot therein corresponding in length to the length of the line image to be formed on said target;

a layer on the surface of said plate away from said target of a dielectric material having the property of emitting secondary electrons when impinged by primary electrons, said layer formed along the sides of said slot;

a first electron beam source for producing a first electron beam, said first source including accelerator electrode means to direct said first electron beam toward said storage element in a pattern which substantially entirely covers the area of said slot but does not extend beyond the area of said layer, the velocity of the first electron beam being selected to produce a secondary emission ratio in said layer of less than unity;

a second electron beam source for producing a second electron beam, the cross section of said second electron beam being substantially smaller than the area of said slot;

means for moving said second electron beam along said slot and for modulating said second electron beam to produce a line image of stored electrical charges on said storage element, the secondary emission ratio in those areas struck by electrons from both said first and said second electron beam sources being greater than unity, whereby electrons pass through said slot without further deflection to form an image on said target corresponding to the line image formed on said storage member by said second electron beam.

2. A line scanning cathode ray tube according to claim 1, and further including a collector electrode adjacent said emissive layer for collecting secondary electrons.

* * * * *